United States Patent

Geyer et al.

[11] 3,970,363
[45] July 20, 1976

[54] LIQUID CRYSTAL CELL FOR A LIQUID CRYSTAL DISPLAY SCREEN

[75] Inventors: Hans Geyer, Baldham; Christoph Rotter; Wolfgang Welsch, both of Munich, all of Germany

[73] Assignee: Siemens Aktiengesellschaft, Berlin & Munich, Germany

[22] Filed: Aug. 16, 1974

[21] Appl. No.: 497,878

[30] Foreign Application Priority Data
Aug. 20, 1973 Germany............................ 2342022

[52] U.S. Cl. ......................................... 350/160 LC
[51] Int. Cl.² ............................................. G02F 1/13
[58] Field of Search ............................... 350/160 LC

[56] References Cited
UNITED STATES PATENTS

| | | | |
|---|---|---|---|
| 3,751,137 | 8/1973 | Fitzgibbons et al. | 350/160 LC |
| 3,807,127 | 4/1974 | Stern | 350/160 LC X |
| 3,808,769 | 5/1974 | Gardiner et al. | 350/160 LC X |

*Primary Examiner*—John K. Corbin
*Assistant Examiner*—Matthew W. Koren
*Attorney, Agent, or Firm*—Hill, Gross, Simpson, Van Santen, Steadman, Chiara & Simpson

[57] ABSTRACT

A liquid crystal cell for a liquid crystal display screen having a pair of plates joined together by a frame to form a chamber for a liquid crystal layer which is hermetically sealed from the exterior of the cell and has a closable access passage characterized by the access passage receiving a ductile metal plug of a metal which is selected from a group consisting of indium, tin, lead and aluminum and a sealing coating covering the plug and a portion of the exterior of the cell surrounding the passage. In one embodiment, the passage is a groove extending inward from an edge of one of the plates and has a depth which decreases as the distance from the edge increases so that it merges with the interior surface of the plate inward of the frame which may be formed with the recess facing the groove. In another embodiment, the passages are apertures having axes which are perpendicular to the plate and are arranged in a region of the plate adjacent to the frame means preferably with an aperture at opposite or diametric corners of the cell. In both embodiments, the sealing coating may be a synthetic adhesive or a portion of the exterior of the cell surrounding the passage or the aperture is metalized with a bright metal film with the metal being selected from a group consisting of silver, gold and platinum and the sealing coating is a layer of solder applied onto the metalized film.

6 Claims, 4 Drawing Figures

U.S. Patent  July 20, 1976  3,970,363
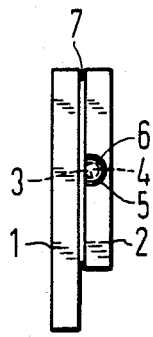
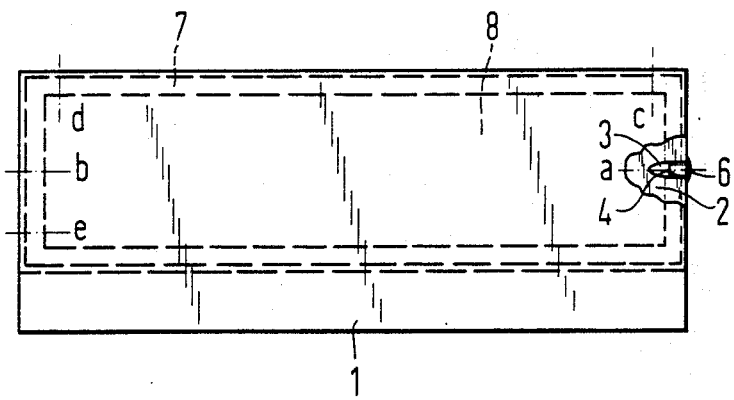
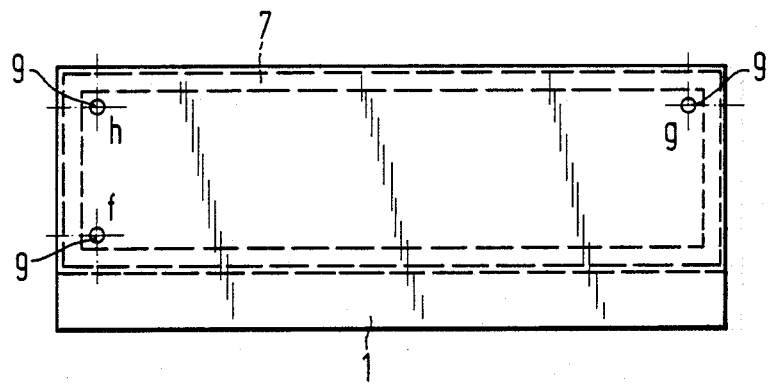
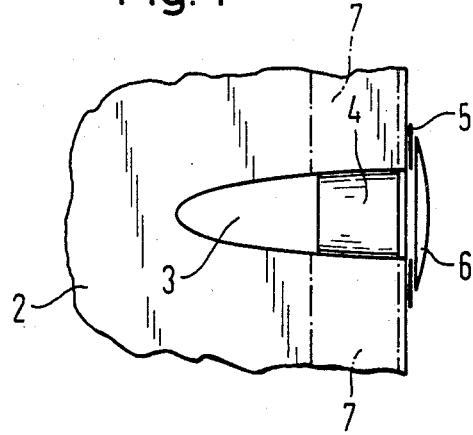

LIQUID CRYSTAL CELL FOR A LIQUID CRYSTAL DISPLAY SCREEN

BACKGROUND OF THE INVENTION

The present invention is directed to liquid crystal cells used in liquid crystal display screens for liquid crystal display devices which cell contains a liquid crystal layer disposed between two carrier plates which plates are spaced apart by a frame and which plates are of insulating material with at least one plate being transparent and the surfaces engaging the layer being provided with electrode patterns.

Liquid crystal cells used in display screens are known in a variety of different embodiments. An example of an embodiment is disclosed in the German printed patent application (Offenlegungsschrift) No. 2,028,089. Known display screens have been used for analog and digital date displays and for one color or multiple color displays. The display screen using a liquid crystal cell exhibits a property of being a thin display device which may include storage of the information being displayed.

To obtain both the quality of reproduction and a long life duration in liquid crystal display screens of the above-mentioned type, it is most important that the liquid crystal layer is hermetically sealed from the exterior of the cell to prevent any penetration of atmospheric influences and moisture. It is also important that the sealing agent used in forming the hermetic seal does not contain organic substances or other reaction sensitive substances which will react with the liquid crystal.

Since it is necessary to avoid any considerable heating during a melting process which excessive heating could lead to destruction of the thin layer of electrodes on the surface of the plates forming the cell, glass solder, which has a suitable softening point, has proved most effective for edge sealing the two plates forming the chamber containing the liquid crystal layer. However, an access opening or passage to the chamber for the purpose of filling and venting the chamber after formation of the cell is still necessary. The above-mentioned problems also occur while closing the access passage. For example, direct closure with a synthetic resin adhesive has been found unsatisfactory due to reaction of some of the materials of the resin adhesive with the liquid crystal material of the layer.

SUMMARY OF THE INVENTION

The present invention is directed to a liquid crystal cell for use as a liquid crystal display screen which cell has a seal which is reliable and easy to produce and will withstand relatively harsh conditions of use. To accomplish these tasks the cell of the present invention has a closable access means which includes a passage communicating with a chamber which is formed by facing parallel surfaces of a pair of carrier plates which surfaces are provided with electrode patterns thereon and are spaced by means forming a frame which means is hermetically sealed to the edges of each of the plates to hermetically seal the chamber from the exterior of the cell. Each of the plates is of electrical insulating material and at least one of the plates is transparent. The closable access means of the present invention includes a plug formed of a ductile metal selected from a group consisting of indium, tin, lead and aluminum which is sealingly disposed in the passage and a sealing coating covering the plug and a portion of the exterior of the seal surrounding the passage. The sealing coating may be a conventional adhesive layer or may be a solder coating in which case the portion of the exterior of the cell is provided with a metalized film on which the solder is applied. Preferably, the metalized film is a bright metal film with the metal selected from a group consisting of silver, gold, or platinum.

One embodiment of the invention utilizes a groove formed in the surface of one of the carrier plates and extending inward from an edge thereof with the depth of the groove decreasing as the distance from the edge increases so that the groove merges with the surface at a point inward of the frame means. In this embodiment, the frame means may be provided with a recess facing the groove.

In another embodiment of the invention, the passages are apertures formed in one of the carrier plates with the axis of the apertures extending perpendicular to the surface or plane of the plates.

In certain embodiments it is desired to have at least two access means such as two grooves which are spaced apart or two of the apertures in the plate which should be placed in regions of the plate adjacent opposite corners of the frame means.

BRIEF DESCRIPTION OF THE DRAWINGS

FIG. 1 is a front view with a portion broken away for illustration of one embodiment of a liquid crystal cell utilizing the principles of the present invention;

FIG. 2 is an end view of the embodiment of FIG. 1;

FIG. 3 is another embodiment of a liquid crystal cell utilizing the principles of the present invention; and FIG. 4 is an enlarged view of the broken away portion of FIG. 1 to illustrate the access means of the present invention.

DESCRIPTION OF THE PREFERRED EMBODIMENT

The principles of the present invention are particularly useful in a liquid crystal cell illustrated in FIG. 1 which is useful as a liquid crystal display screen for a liquid crystal display device. The liquid crystal cell includes a pair of carrier plates formed by an upper plate 1 and a lower plate 2. Each plate 1 and 2 is formed of electrical insulating material such as glass and at least one of the plates is transparent. The two plates are hermetically sealed together by a frame means 7, which has a rectangular shape, to form a chamber for receiving the liquid crystal material. Preferably, the frame means if formed by glass solder which is applied to one of the plates by a silk-screen process and, in addition to sealing the plates together to form the chamber, maintains precise distances between the two facing surfaces of the plates so that the chamber 8 has a constant dimension with the layer of liquid crystal material disposed therein having a constant thickness.

In order to energize portions of the layer disposed in chamber 8, the inner or facing surface of each of the plates is provided with an electrode pattern (not shown in detail) which patterns may comprise several digital electrodes comprised of subsidiary electrodes and which electrodes will have leads extending to an edge of each respective plate. The electrode patterns may be conventional transparent electrodes which are formed by coating selected portions of the surface of each plate with tin oxide in a conventional manner well known in the art.

In forming the cell illustrated in FIGS. 1 and 2, each of the carrier plates 1 and 2 is provided with the electrode patterns and a glass solder frame 7 is applied to one of the plates. Then the two plates are assembled in facing relationship and the solder frame is softened to form a hermetic seal between the two plates. In order to have access to the chamber after forming the hermetic seal, access means which includes a passage that communicates the chamber to the exterior must be provided prior to forming the seal.

As best illustrated in FIG. 4, the passage of the embodiment of FIGS. 1 and 2 is a groove or channel 3 which is formed in the surface of one of the plates such as lower plate 2. The groove 3 extends inward from the edge of the plate and has a substantially semi-circular cross section. The axis of the groove is such that as the distance from the edge of the plate 2 increases, the depth of the groove 3 decreases so that the groove eventually merges with the surface of the plate at a point spaced inward of the frame means 7 and is terminated.

The groove or channel 3, which is formed prior to applying the solder frame 7 and prior to forming the seal, is cut or ground into an interior or facing surface of the glass plate 2. For example, a grinding disc, which is a hard metal grinding disc of a thickness of approximately 1 mm, is utilized and moved in a slanting or inclined direction relative to the plane of the surface of the plate 2 to form the groove or channel having a length of the few mm, an axis which is inclined to the surface of the plate 2, and a depth which goes from zero to approximately 1 mm at the edge of the plate.

Subsequent to the formation of the groove or channel 3, the frame 7 is applied by a silk-screen printing process and the two plates 1 and 2 are then assembled together with the frame 7 therebetween. The assembled plates are heated to soften the glass solder of the frame 7 to form the seal. If desired, the frame formed by the glass solder 7 can be provided with a recess facing the groove 3.

Subsequent to the formation of the seal, the interior of the chamber 8 is cleansed by a cleansing or flushing process with an appropriate organic solvent such as chloroform, acetone, or the like and then may be subjected to an evacuation process. Subsequent to the cleansing and flushing process and the evacuation process, if utilized, the liquid crystal material is inserted through the groove or channel 3 to fill the chamber 8.

With the chamber 8 filled, the access means is closed by a plug 4 which has a short, mandrel shape, for example, it is generally slightly conical. The plug 4 consists of a ductile metal selected from a group of indium, tin, lead and aluminum.

To complete the seal of the closable access means, an additional sealing coating 6 is applied to cover the exterior portion of the plug and a portion of the exterior of the plate surrounding the passage formed by the groove or channel 3. The coating 6 may be either a synthetic adhesive resin coating or a coating of metal solder. If the coating 6 is metal solder, a metalized film 5 is applied to a portion of the exterior of the cell which portion surrounds the passage. Preferably, the metalized film is applied prior to the application of the glass solder frame 7 and the metalized film is preferably a bright metal film with the metal being selected from a group consisting of silver, gold and platinum.

One or more channels 3 can be utilized and as illustrated are located approximately on the centers indicated by lines a and b of the narrow sides of the plate 2, or may be located adjacent the corners as indicated by the lines c, d, and e. If during the process of cleansing and filling the chamber 8, the device is placed in a vacuum only a single channel or groove 3 is necessary and can be located in any of the above-mentioned positions. However, if no preliminary evacuation is utilized, it is desirable to provide at least two channels which may be advantageously located adjacent to the ends of the longitudinal sides of the plates 2 at the locations which are identified by lines c, d, and e.

Instead of utilizing grooves or channels such as 3 to form the passage, it may be advantageous to utilize one or more apertures 9 which have an axis extending perpendicular to the plane of the plate 1 or 2, and, as illustrated in FIG. 3, the apertures 9 were bored in upper plate 1. The aperture or apertures 9 are preferably located in a region which is adjacent a corner of the frame means 7 with only one aperture being required if the evacuation process is utilized. If two apertures 9 are utilized because the filling process does not utilize the evacuation process, they are disposed in spaced and preferably diametrically opposite corners as indicated by the positions f. g and h.

Regardless of the number of apertures 9 utilized, each one is closed by a ductile metal plug 4 as in the previously described embodiment and a coating layer 6 is applied over the exterior of the plug and a portion of the exterior of the cell surrounding the plug. As in the above-described embodiment, a metalized layer such as 5 may be applied to the portion and the coating 6 may be a solder coating or the coating 6 may be a coating of synthetic adhesive resin which is applied directly on the portion of the exterior which surrounds the opening.

Although various minor modifications might be suggested by those versed in the art, it should be understood that we wish to employ within the scope of the patent granted hereon, all such modifications as reasonably and properly come within the scope of our contribution to the art.

We claim:

1. In a liquid crystal cell for use as a display screen for a liquid crystal display device, said cell having a chamber containing a liquid crystal layer, said chamber being formed by facing parallel surfaces of a pair of carrier plates which surfaces are each provided with an electrode pattern thereon and are spaced by means forming a frame which means is hermetically sealed to the edges of each of the plates to hermetically seal the chamber from an exterior of the cell, each of the plates being of an electrical insulating material and at least one plate being transparent, and the cell having at least one closable access means foe enabling communication with the chamber from the exterior of the cell, the improvement comprising each of the closable access means comprising a passage extending between the interior of the chamber and the exterior of the cell, said passage comprising a groove on one of said facing surfaces of one of said pair of plates, said groove extending inwardly from an edge of the plate into the interior of the chamber and having a depth decreasing as the distance from the edge increases so that the groove terminates at a point spaced inward of the frame means, a plug formed of a ductile metal sealingly disposed in the passage, and a sealing coating covering the plug and a portion of the exterior of the cell surrounding the passage.

2. In a liquid crystal cell according to claim 1, which includes a metalized layer on said portion of the exterior of the cell and wherein said coating is a layer of solder.

3. In a liquid crystal cell according to claim 2, wherein said metalized layer comprises a bright metal film with the metal of the film being selected from a group consisting of silver, gold and platinum.

4. In a liquid crystal cell according to claim 1, wherein said coating is a layer of synthetic adhesive.

5. In a liquid crystal cell according to claim 1, wherein said frame means has a recess facing said groove.

6. In a liquid crystal cell according to claim 1, wherein said ductile metal is selected from a group consisting of indium, tin, lead and aluminum.

* * * * *